United States Patent
Illedits et al.

(10) Patent No.: US 11,066,275 B2
(45) Date of Patent: Jul. 20, 2021

(54) CONVEYANCE BELT FOR A CONVEYOR

(71) Applicant: Otis Elevator Company, Farmington, CT (US)

(72) Inventors: Thomas Illedits, Neufeld an der Leitha (AT); Alexander Turek, Munchendorf (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/720,237

(22) Filed: Dec. 19, 2019

(65) Prior Publication Data
US 2020/0231409 A1 Jul. 23, 2020

(30) Foreign Application Priority Data
Jan. 23, 2019 (EP) .................................. 19153267

(51) Int. Cl.
*B66B 11/04* (2006.01)
*B66B 7/06* (2006.01)
*B66B 21/10* (2006.01)
*B65G 15/08* (2006.01)

(52) U.S. Cl.
CPC .............. *B66B 7/062* (2013.01); *B66B 21/10* (2013.01); *B65G 15/08* (2013.01)

(58) Field of Classification Search
CPC ..... B66B 7/062; B66B 11/0476; B66B 23/14; F16G 1/04; F16G 1/06
USPC ......... 198/330, 833, 834, 837, 847; 474/153
See application file for complete search history.

(56) References Cited

U.S. PATENT DOCUMENTS

| 3,986,595 | A | | 10/1976 | Asano et al. | |
|---|---|---|---|---|---|
| 4,284,191 | A | * | 8/1981 | Lavau | B65G 23/38 198/792 |
| 4,397,096 | A | * | 8/1983 | Kraft | B66B 23/02 33/655 |
| 4,484,674 | A | * | 11/1984 | Lunardi | B66B 23/14 198/332 |
| 4,653,632 | A | * | 3/1987 | Timmer | A01D 17/10 198/822 |
| 4,884,393 | A | * | 12/1989 | Hilleby | A01D 45/006 56/327.1 |
| 5,150,780 | A | | 9/1992 | Fischer | |
| 6,170,632 | B1 | | 1/2001 | Shimura et al. | |
| 6,398,003 | B1 | | 6/2002 | Jasinetzky | |
| 6,543,599 | B2 | | 4/2003 | Jasinetzky | |
| 6,640,957 | B2 | * | 11/2003 | Fargo | B66B 21/10 198/321 |
| 7,063,202 | B2 | | 6/2006 | Ossendorf | |
| 7,410,043 | B2 | | 8/2008 | Aulanko et al. | |
| 7,537,102 | B2 | * | 5/2009 | Matheisl | B66B 23/12 198/326 |

(Continued)

FOREIGN PATENT DOCUMENTS

| CN | 1265372 A | 9/2000 |
|---|---|---|
| CN | 103130083 A | 6/2013 |

(Continued)

*Primary Examiner* — Joseph A Dillon, Jr.
(74) *Attorney, Agent, or Firm* — Cantor Colburn LLP

(57) ABSTRACT

A conveyance belt (12) for a conveyor (1) comprises a plurality of cavities (26a-26c). Each of the cavities (26a-26c) is configured for form-fittingly accommodating a corresponding insert (24a-24f) for connecting the conveyance belt (12) with a conveyance element (20) of the conveyor (1).

8 Claims, 12 Drawing Sheets

(56) References Cited

U.S. PATENT DOCUMENTS

| | | |
|---|---|---|
| 8,322,508 B2 | 12/2012 | Matheisl et al. |
| 8,424,667 B2 | 4/2013 | Gonzalez Alemany et al. |
| 8,776,993 B2 | 7/2014 | Umeda |
| 9,038,806 B2* | 5/2015 | Makimattila ........... B66B 23/00 198/321 |
| 9,617,122 B2 | 4/2017 | Matheisl et al. |
| 9,683,630 B2* | 6/2017 | Vollbarth .................. F16G 1/28 |
| 10,035,681 B2 | 7/2018 | Turek |
| 2003/0116403 A1* | 6/2003 | Fargo ..................... B66B 21/10 198/330 |
| 2005/0279610 A1* | 12/2005 | Ossendorf ............... B66B 23/12 198/321 |
| 2005/0279611 A1* | 12/2005 | Ossendorf ............... B66B 23/02 198/321 |
| 2006/0027438 A1* | 2/2006 | Fargo ..................... B66B 23/02 198/330 |
| 2006/0144672 A1* | 7/2006 | Thaler .................. B66B 23/028 198/326 |
| 2008/0135376 A1* | 6/2008 | Hauser .................. B66B 25/006 198/322 |
| 2014/0106918 A1* | 4/2014 | Richter ..................... F16G 1/16 474/202 |
| 2017/0362060 A1* | 12/2017 | Turek .................... B66B 23/026 |
| 2019/0292018 A1* | 9/2019 | Turek .................... B66B 23/024 |
| 2020/0191239 A1* | 6/2020 | Schreiber ................. F16G 3/00 |

FOREIGN PATENT DOCUMENTS

| | | |
|---|---|---|
| CN | 203428716 U | 2/2014 |
| CN | 103663080 B | 3/2014 |
| CN | 105129585 A | 12/2015 |
| CN | 106542415 B | 3/2018 |
| EP | 0054687 B1 | 12/1984 |
| EP | 1205419 B1 | 5/2002 |
| EP | 3147239 A1 | 3/2017 |
| EP | 3044153 B1 | 6/2017 |
| EP | 3257804 A1 | 12/2017 |
| EP | 3099617 B1 | 2/2018 |
| JP | 2005298077 A | 10/2005 |
| JP | 5963333 B2 | 8/2016 |
| WO | 0066476 A1 | 11/2000 |
| WO | 2004063077 A1 | 7/2004 |
| WO | 2013174371 A1 | 11/2013 |

* cited by examiner

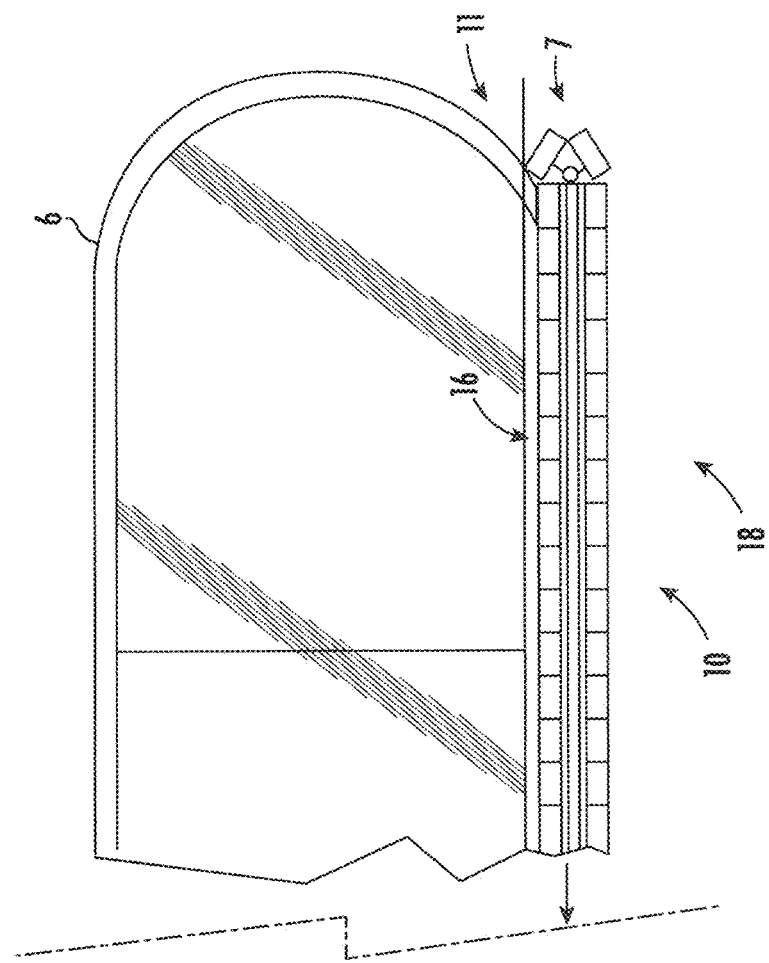
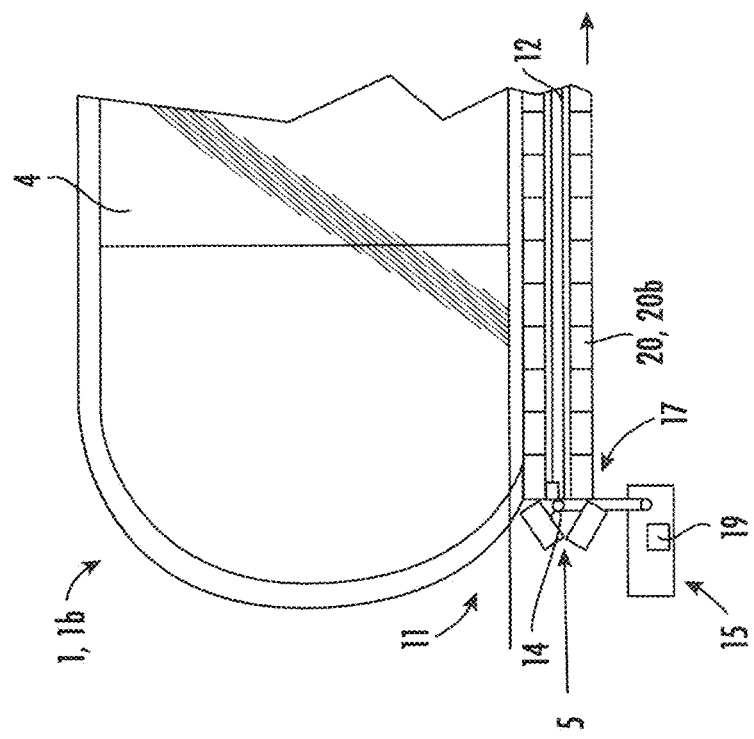
FIG. 2

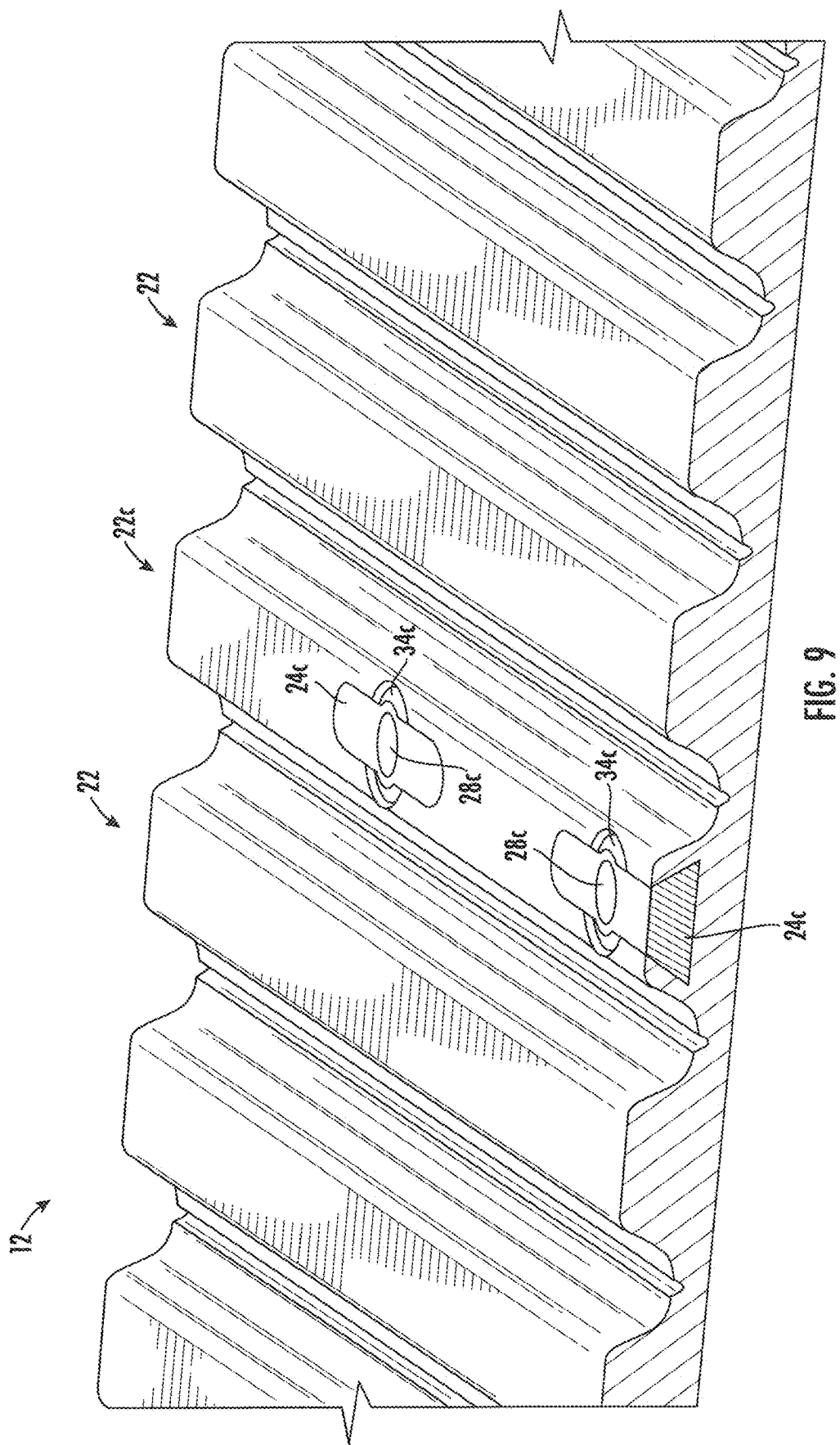

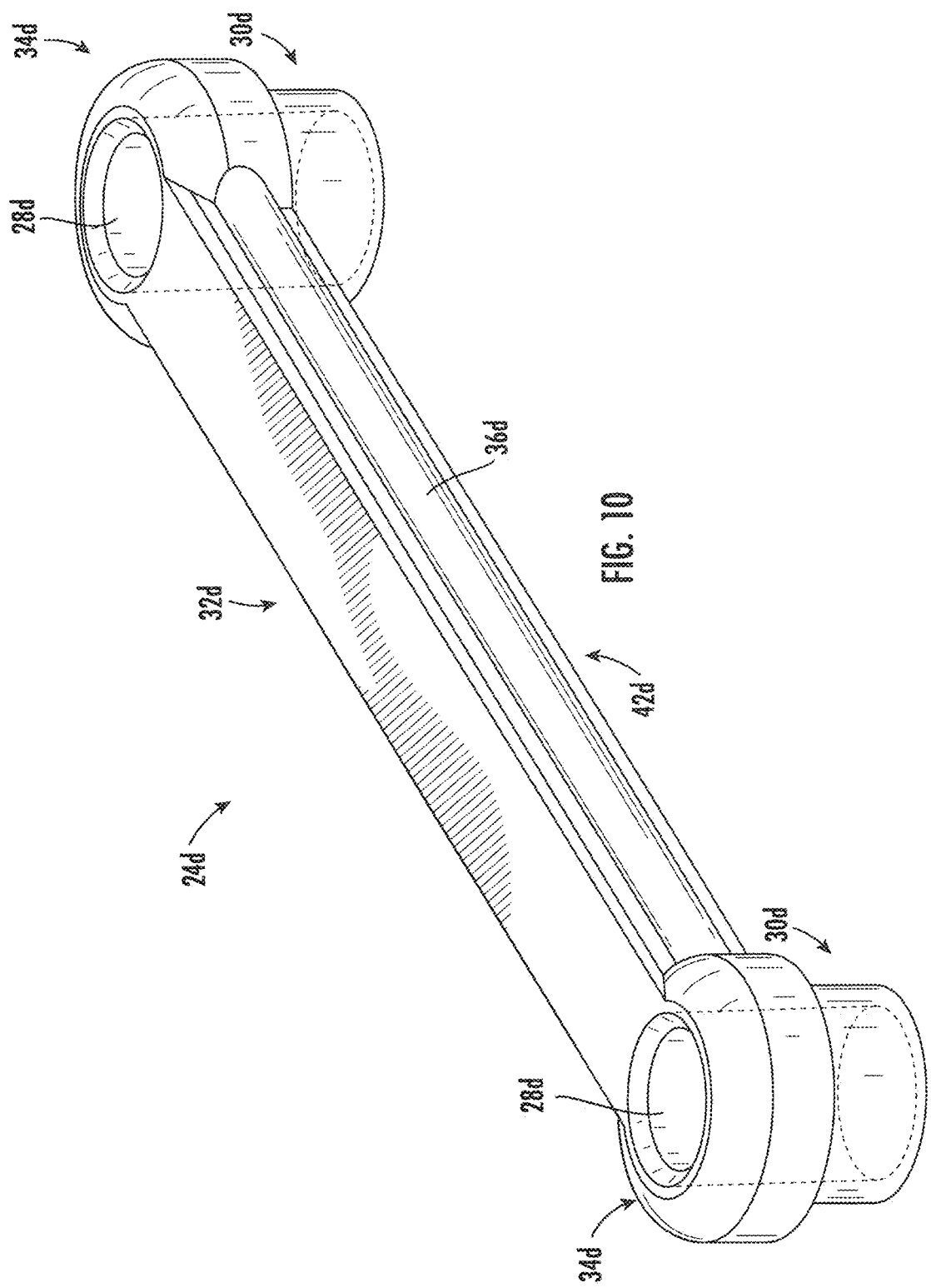

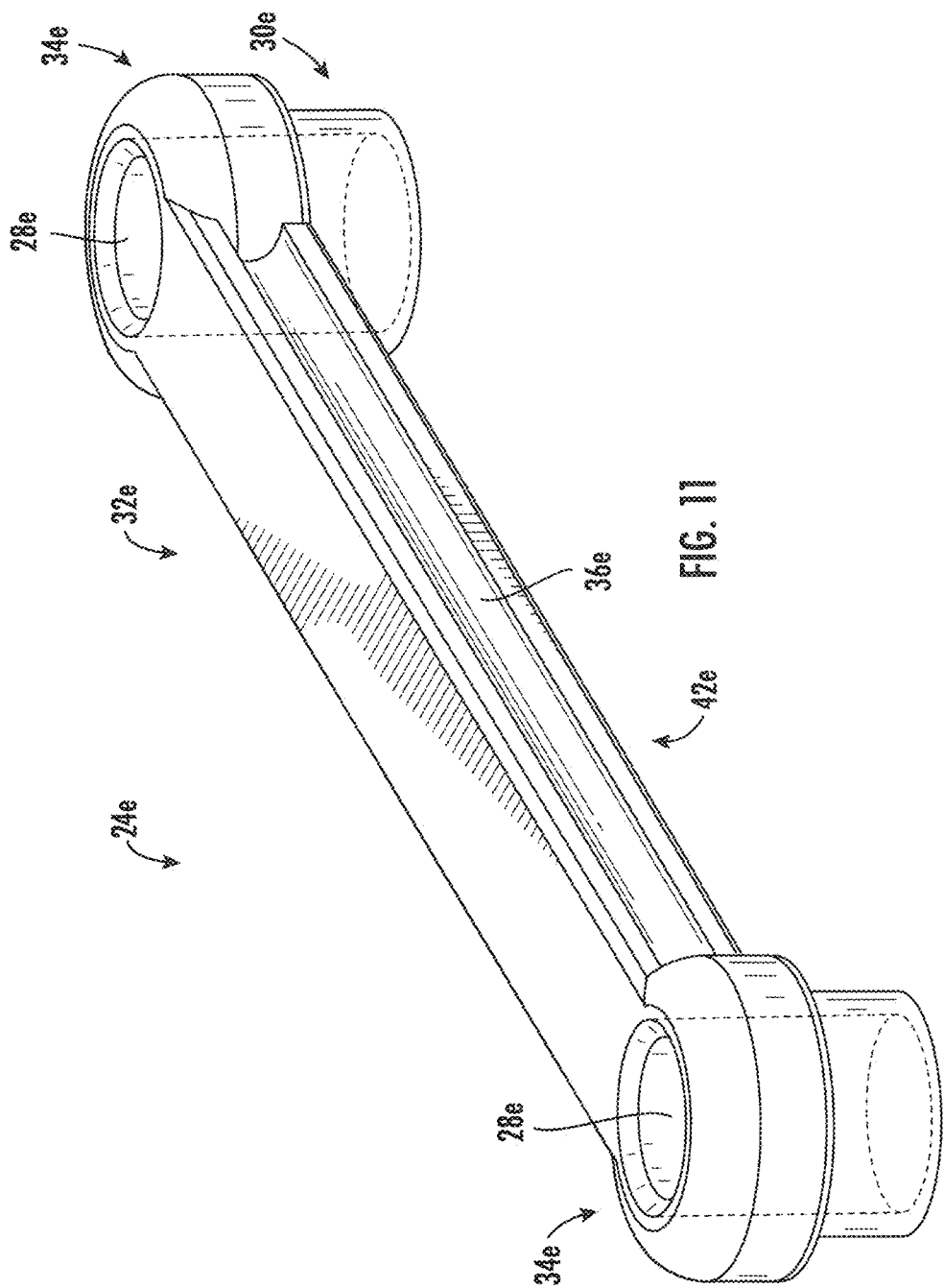

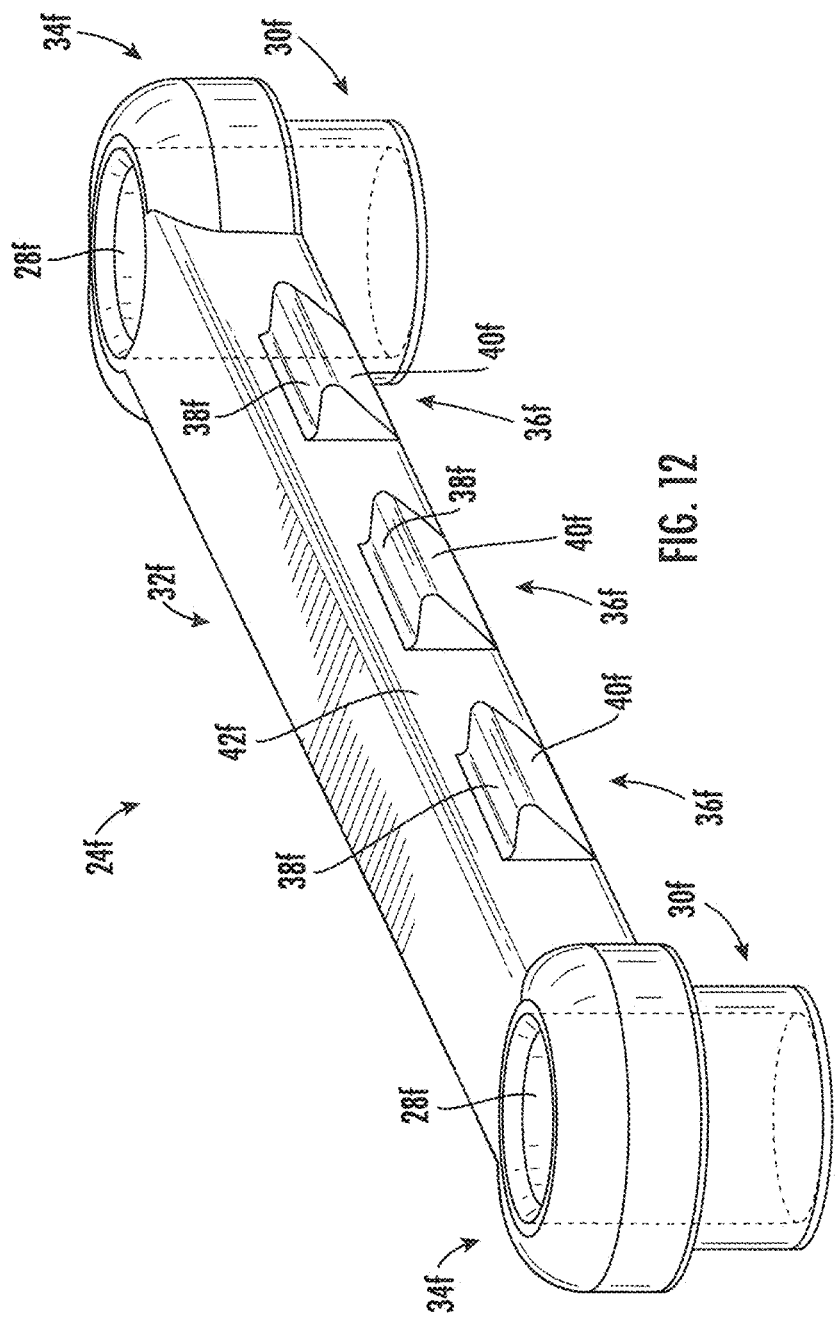

CONVEYANCE BELT FOR A CONVEYOR

FOREIGN PRIORITY

This application claims priority to European Patent Application No. 19153267.0, filed Jan. 23, 2019, and all the benefits accruing therefrom under 35 U.S.C. § 119, the contents of which in its entirety are herein incorporated by reference.

BACKGROUND

The invention relates to a conveyance belt for a conveyor.

Conveyors, such as people conveyors, usually comprise a plurality of conveyance elements, e.g. pallets or steps, at least some of which are drivingly coupled to at least one drive element, in particular a conveyance belt.

It would be beneficial to provide an improved coupling for connecting the conveyance elements with the conveyance belt, in particular a coupling which allows connecting the conveyance elements with the conveyance belt more easily.

SUMMARY

According to an exemplary embodiment of the invention, a conveyance belt for a conveyor extends in a conveyance direction and comprises a plurality of cavities. Each of the cavities is configured for form-fittingly accommodating a corresponding insert for connecting the conveyance belt with a conveyance element of the conveyor in order to prevent the insert from dropping out of the cavity.

Exemplary embodiments of the invention also include inserts configured for being form-fittingly inserted into the cavities of a conveyance belt according to an exemplary embodiment of the invention.

Exemplary embodiments of the invention further include a conveyance system for a conveyor comprising a conveyance belt according to an exemplary embodiment of the invention, a plurality of corresponding inserts, wherein each insert is accommodated within one of the cavities of the conveyance belt, and a plurality of conveyance elements connected to the conveyance belt via the inserts.

Exemplary embodiments of the invention also include a conveyor, in particular a people conveyor, such as an escalator or a moving walkway, comprising a conveyance system according to an exemplary embodiment of the invention.

Exemplary embodiments of the invention further include a method of inserting an insert into a cavity of a conveyance belt according to an exemplary embodiment of the invention, wherein the method includes elastically deforming a portion of the conveyance belt including the cavity in order to allow introducing the insert into the cavity.

A conveyance element may be connected with the at least one insert after it has been introduced into the cavity.

Exemplary embodiments of the invention allow fixing inserts, which are used for mechanically connecting conveyance elements with a conveyance belt, to the conveyance belt without employing any additional fixing elements.

As a result, exemplary embodiments of the invention allow connecting conveyance elements with the conveyance belt easily and at low costs.

A number of optional features are set out in the following. These features may be realized in particular embodiments, alone or in combination with any of the other features.

The conveyance belt may be a toothed belt or a cogged belt comprising a plurality of teeth allowing the conveyance belt to mechanically engage with a drive element, such as a drive sheave. The cavities may be formed in at least some of said teeth. As the teeth comprise a larger thickness than the gap formed between adjacent teeth, the teeth are well suited for accommodating and securely fixing the inserts.

In order to allow connecting the conveyance elements equidistantly to the conveyance belt, the cavities may be spaced equidistantly from each other along the conveyance direction.

As the teeth usually extend orthogonally to the conveyance direction, each of the cavities may have a smaller dimension in a direction extending parallel to the conveyance direction, and a larger dimension in a direction extending orthogonally to the conveyance direction.

A plurality of cavities spaced apart from each other in a direction extending orthogonally to the conveyance direction, may be formed at a same position along the conveyance direction, in particular within the same tooth. Such a configuration allows connecting the conveyance elements even more securely with the conveyance belt, it in particular allows preventing the conveyance elements connected with the conveyance belt from rotating with respect to the conveyance belt.

For form-fittingly fixing a correspondingly formed insert within the cavity, at least one of the cavities may be formed with an undercut. An undercut provides a secure form-fit connecting between the conveyance belt and the insert.

An undercut may be provided by a suitable cross-sectional shape of the at least one cavity. The cross-section of the at least one cavity, for example, may have a trapezoidal shape.

Alternatively or additionally, at least one of the cavities may comprise at least one recess configured for accommodating a matching protrusion of a corresponding insert for fixing the insert within the cavity.

Alternatively or additionally, at least one of the cavities may comprise at least one protrusion configured for extending into a matching recess formed within a corresponding insert for fixing the insert within the cavity.

An insert according to an exemplary embodiment of the invention may comprise at least one opening, in particular a threaded opening, which allows connecting the insert with a conveyance element of a conveyor by employing an appropriate fixing element, such as a bolt or screw.

Alternatively or additionally, an insert according to an exemplary embodiment of the invention may comprise an extension, in particular a threaded extension, which is configured for engaging with a corresponding fixing element, such as a threaded sleeve, for coupling a conveyance element with the insert.

The insert in particular may comprise two or more openings or protrusions, which may be provided at opposing ends of the insert, in order to prevent a conveyance element mounted to the insert from rotating with respect to the insert.

The insert may be made of a metallic material, such as steel, in particular rustless steel.

A conveyor according to an exemplary embodiment of the invention may comprise at least two drive elements extending parallel with each other. Such a configuration provides redundancy and/or splits the driving forces between a plurality of drive elements. Each of the at least two drive elements may be provided with at least one monitoring device according to an exemplary embodiment of the invention.

The at least one drive element may be configured for traveling along a closed loop defining an endless path of the conveyance elements.

The conveyor may be a people conveyor, in particular a moving walkway in which the conveyance elements are pallets. The moving walkway may extend horizontally or in an inclined direction.

In an alternative configuration, the people conveyor may be an escalator in which the conveyance elements are steps.

DRAWING DESCRIPTION

In the following exemplary embodiments of the invention are described with reference to the enclosed figures.

FIG. 2 depicts a schematic side view of another people conveyor, in particular of a moving walkway.

FIGS. 8 and 9 depict sectional views of a tooth of the conveyance belt accommodating two inserts according to the exemplary embodiment depicted in FIG. 7.

FIG. 10 depicts a perspective view of an insert according to a further exemplary embodiment.

FIG. 11 depicts a perspective view of an insert according to another exemplary embodiment.

FIG. 12 depicts a perspective view of an insert according to yet another exemplary embodiment.

DETAILED DESCRIPTION

Figure 1:
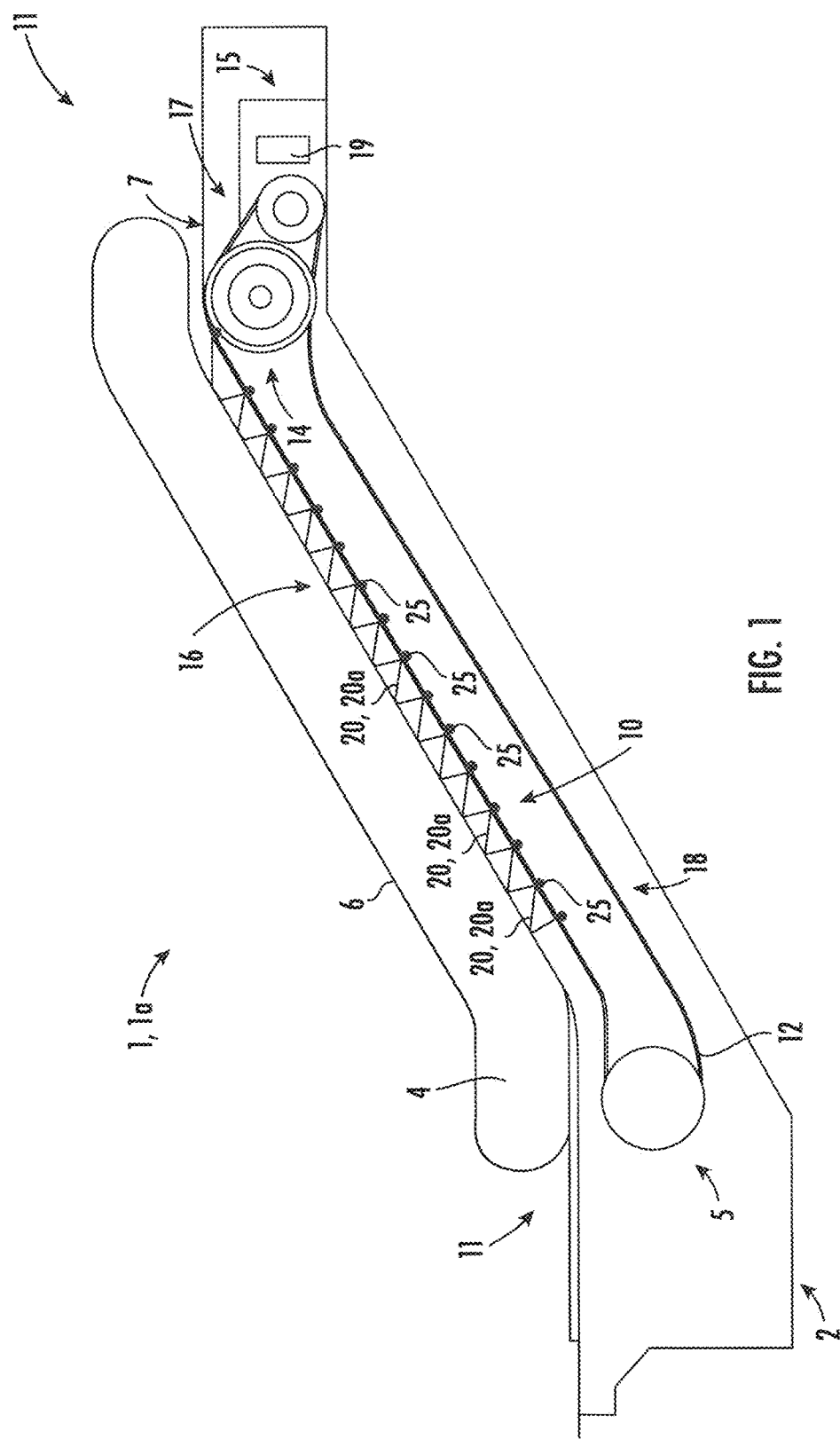
FIG. 1 depicts a schematic side view of a people conveyor, in particular of an escalator.

FIG. 1 depicts a schematic side view of a conveyor 1, in particular a people conveyor in the form of an escalator 1*a*, comprising a truss 2 and a conveyance band 10. The conveyance band 10 includes a plurality of conveyance elements 20, in particular steps 20*a*, and extends in a (longitudinal) conveyance direction between two landing portions 11. The conveyance elements 20 comprise rollers 25 guided and supported by guide rails (not shown). For clarity, only some of the conveyance elements 20 are depicted in FIG. 1, and not all conveyance elements 20 and rollers 25 are provided with reference signs.

In turnaround portions 5, 7 next to the landing portions 11, the conveyance band 10 passes from an upper conveyance portion 16 into a lower return portion 18, and vice versa.

The conveyance elements 20 are connected to a conveyance belt 12, extending along a closed loop and configured for driving the conveyance elements 20. The conveyance belt 12 is driven by a conveyance sheave 14. A drive 15 including a motor 19 is provided for driving the conveyance sheave 14 via a transmission element 17, such as a transmission belt or a transmission chain.

Balustrades 4 supporting moving handrails 6 extend parallel to the conveyance portion 16.

FIG. 2 depicts a schematic side view of another conveyor 1, in particular a people conveyor in the form of a moving walkway 1*b*.

The moving walkway 1*b* comprises an endless conveyance band 10 including conveyance elements 20, in particular pallets 20*b*, moving between two landing portions 11 in a (longitudinal) conveyance direction in an upper conveyance portion 16 and opposite to the conveyance direction in a lower return portion 18.

Turnaround portions 5, 7, are provided at both ends of the moving walkway 1*b*. In the turnaround portions 5, 7 the conveyance band 10 passes from the conveyance portion 16 into the return portion 18, and vice versa.

The conveyance elements 20 are connected to a conveyance belt 12 extending along a closed loop and configured for driving the conveyance elements 20. The conveyance belt 12 is driven by a conveyance sheave 14. A drive 15 including a motor 19 is provided for driving the conveyance sheave 14 via a transmission element 17, e.g. a transmission belt or a transmission chain.

Balustrades 4 supporting moving handrails 6 extend parallel to the conveyance portion 16.

Figure 3:
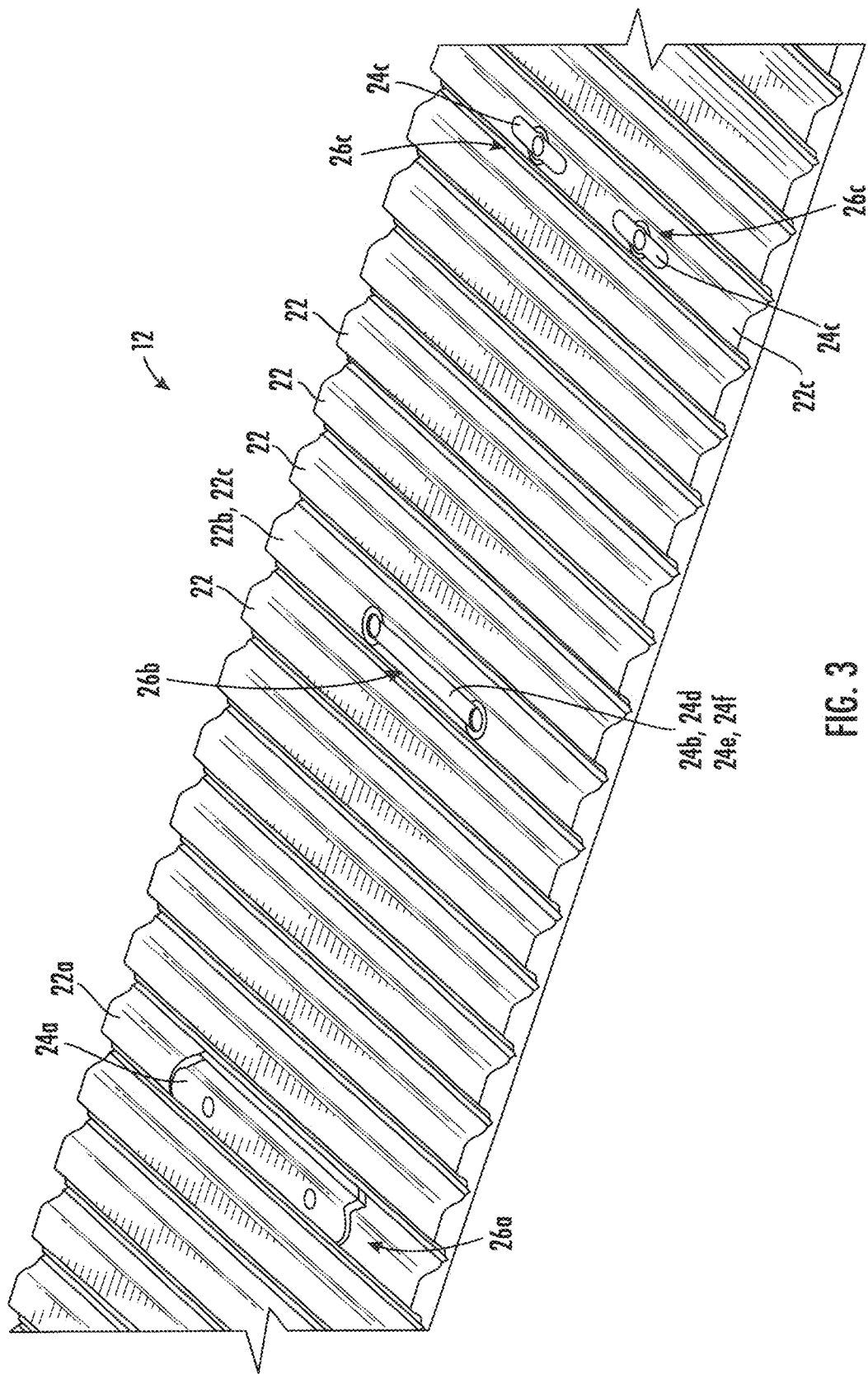
FIG. 3 depicts a perspective view of a section of a conveyance belt according to an exemplary embodiment of the invention.

FIG. 3 depicts a perspective view of a section of a conveyance belt 12 according to an exemplary embodiment of the invention.

The conveyance belt 12 depicted in FIG. 3 is a toothed belt comprising a plurality of teeth 22, 22*a*-22*c*. The teeth 22, 22*a*-22*c* are formed on one side of the conveyance belt 12, which is the upper side of the conveyance belt 12 in the orientation of the conveyance belt 12 depicted in FIG. 3.

The teeth 22, 22*a*-22*c* are spaced apart from each other in the longitudinal direction, and they are configured for engaging with the conveyance sheave 14 (not shown in FIG. 3) in order to allow the conveyance sheave 14 to drive the conveyance belt 12. For clarity of the illustration, not all teeth 22, 22*a*-22*c* are denoted with reference signs in FIG. 3.

In order to allow connecting the conveyance elements 20 (not shown in FIG. 3) with the conveyance belt 12, inserts 24*a*-24*f* are arranged within the conveyance belt 12. The inserts 24*a*-24*f* in particular are arranged within corresponding cavities 26*a*-26*c* formed within the conveyance belt 12.

The cavities 26*a*-26*c* in particular are formed in some of the teeth 22*a*-22*c*. In the exemplary embodiment depicted in FIG. 3, a cavity 26*a*-26*c* respectively accommodating an insert 24*a*-24*f* is formed in every seventh tooth 22*a*-22*c*. This, however, is only an exemplary configuration, and the skilled person understands that the number of the teeth 22, 22*a*-22*c* between adjacent cavities 26*a*-26*c*/inserts 24*a*-24*f* may vary according to the circumstances of the respective configuration. The number of teeth 22 between adjacent inserts 24*a*-24*f* in particular may depend on the dimensions of the teeth 22, 22*a*-22*c* and the conveyance elements 20 in the conveyance direction.

For illustrative reasons, different types of inserts 24*a*-24*f* are depicted in FIG. 3. However, usually the same type of insert 24*a*-24*f* is used for all inserts 24*a*-24*f* within as single conveyance belt 12.

The tooth 22*a* accommodating the first insert 24*a* shown on the left side of FIG. 3 is depicted semi-transparently in order to illustrate the embedding of the insert 24*a* within the tooth 22*a* more clearly.

For preventing inserts 24*a*-24*f* from dropping out of the conveyance belt 12, all inserts 24*a*-24*f* are fixed within the conveyance belt 12 by form-fit only, i.e. the inserts 24*a*-24*f* are fixed within the conveyance belt 12 without employing any additional fixing elements. This allows installing the inserts 24*a*-24*f* within the conveyance belt 12 at low costs.

Figure 4:
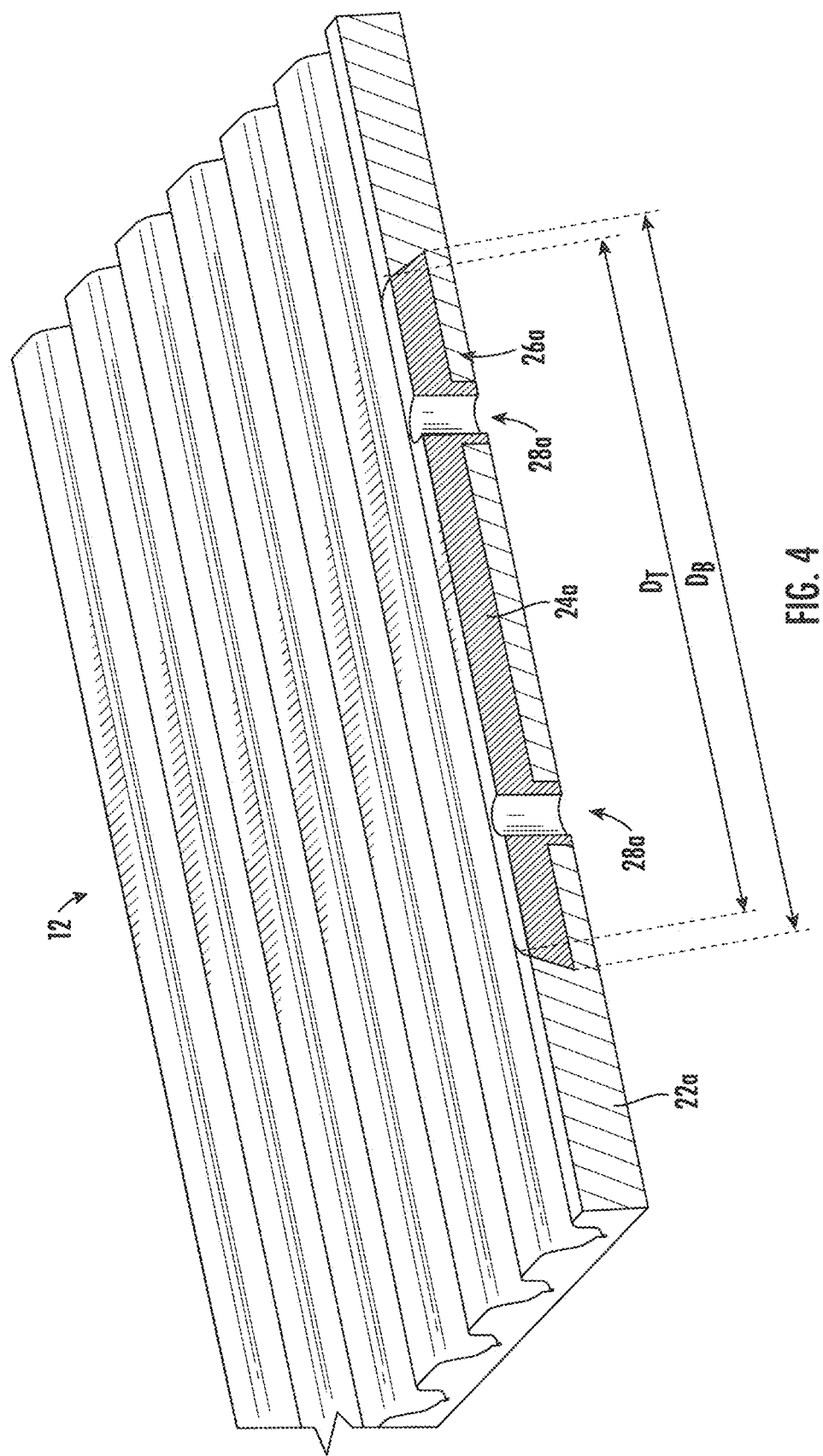
FIG. 4 depicts a sectional view through a tooth of a conveyance belt accommodating an insert according to an exemplary embodiment of the invention.
Figure 5:
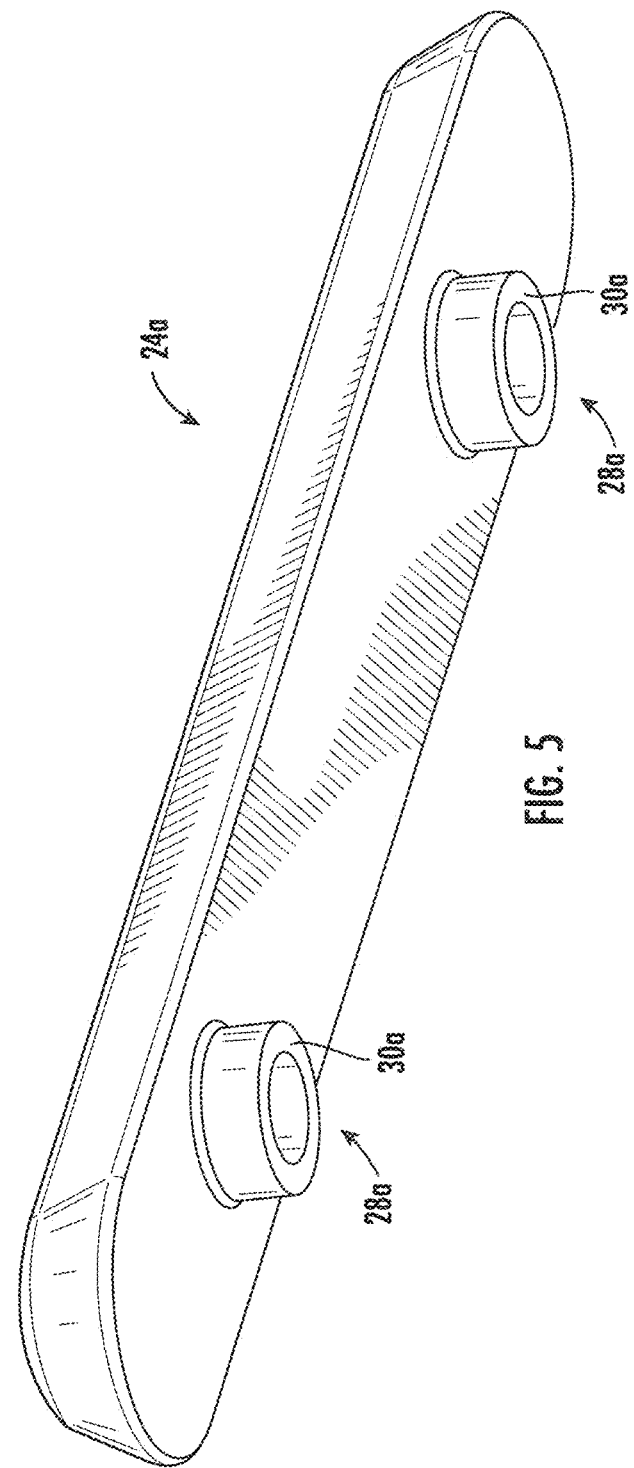
FIG. 5 depicts a perspective view of an insert according to the exemplary embodiment depicted in FIG. 4.

FIG. 4 depicts a sectional view through a tooth 22*a* of a conveyance belt 12 accommodating an insert 24*a* according to an exemplary embodiment of the invention, and FIG. 5 depicts a perspective view of an insert 24a according to the exemplary embodiment depicted in FIG. 4.

FIG. 4 illustrates that a cavity 26a configured for accommodating the insert 24a is formed within the tooth 22a.

The insert 24a and the cavity 26a are shaped so that an undercut fixing the insert 24a within the cavity 26a is formed. In order words, as clearly visible in FIG. 4, the extension $D_T$ of the cavity 26a at its open top side is smaller than the extension $D_B$ of the cavity 26a at the closed bottom side within the conveyance belt 12 ($D_T$<$D_B$).

In other words, the cavity 26a tapers from its closed bottom side to its open top side.

As illustrated in FIGS. 4 and 5, the insert 24a is shaped correspondingly, i.e. with a small extension, which matches the extension $D_T$ at the top side of the cavity, at its top, and with a larger extension, which matches the extension $D_B$ at the bottom of the cavity 26a, at its bottom.

Although only the extensions $D_T$, $D_B$ in a direction which is oriented orthogonally to the conveyance direction of the conveyance belt 12 are illustrated in FIG. 4, it is apparent from FIGS. 4 and 5 that the same rule ($d_T$<$d_B$) applies to the extensions $d_T$, $d_B$ (not explicitly denoted in the figures) of the cavity 26a in the conveyance direction of the conveyance belt 12 as well.

The skilled person understands that for achieving a suitable form-fit between an insert 24a-24f and a corresponding cavity 26a-26c it may be sufficient that the extension $D_T$, $d_T$ at the top side is smaller than the extension $D_B$, $d_B$ at the top side in at least one dimension, i.e. that $D_T$<$D_B$ or $d_T$<$d_B$.

As a result, when the insert 24a is arranged within the cavity 26a, as it is illustrated in FIG. 4, the larger bottom of the insert 24a cannot pass the narrow opening at the top of the cavity 26a, and thus, the insert 24a is securely fixed within the cavity 26a.

The abutting inclined lateral surfaces of the insert 24a and the cavity 26a in particular constitute a wedge-like configuration which blocks any movement of the insert 24a out of the cavity 26a.

Usually, the conveyance belt 12 is produced with appropriate cavities 26a, e.g. by extrusion, and the inserts 24a are inserted into the cavities 26a subsequently.

For inserting an insert 24a into an existing cavity 26a, the conveyance belt 12, which is made of an elastic material, is locally deformed allowing the relatively wide bottom of the insert 24a to pass through the narrow opening at the top of the cavity 26a.

This special deformation of the conveyance belt 12 has to be done on purpose. The special deformation of the conveyance belt 12, which is necessary for allowing the wide bottom of the insert 24a to pass the narrow opening provided at the top of the cavity 26a, in particular does not occur "accidentally" during normal operation of the conveyor 1. Thus, the insert 24a cannot inadvertently move out of the cavity 26a during operation of the conveyor 1.

In the exemplary embodiment depicted in FIGS. 4 and 5, two openings 28a are provided within the insert 24a. The openings 28a are configured for accommodating appropriate fixing elements (not shown), such as bolts or screws, for fixing a conveyance element 20 to the insert 24a. The openings 28a may be provided with threads, respectively, which are configured for engaging with screws inserted into the openings 28a. Alternatively, the fixing elements may extend through the openings 28a to be fixed by corresponding securing elements (not shown), such as splints or nuts, applied to the fixing elements on the opposite side of the insert 24a/conveyance belt 12.

For increasing the mechanical stability, each opening 28a is surrounded by a cylindrical extension 30a extending completely through the conveyance belt 12.

Figure 6:
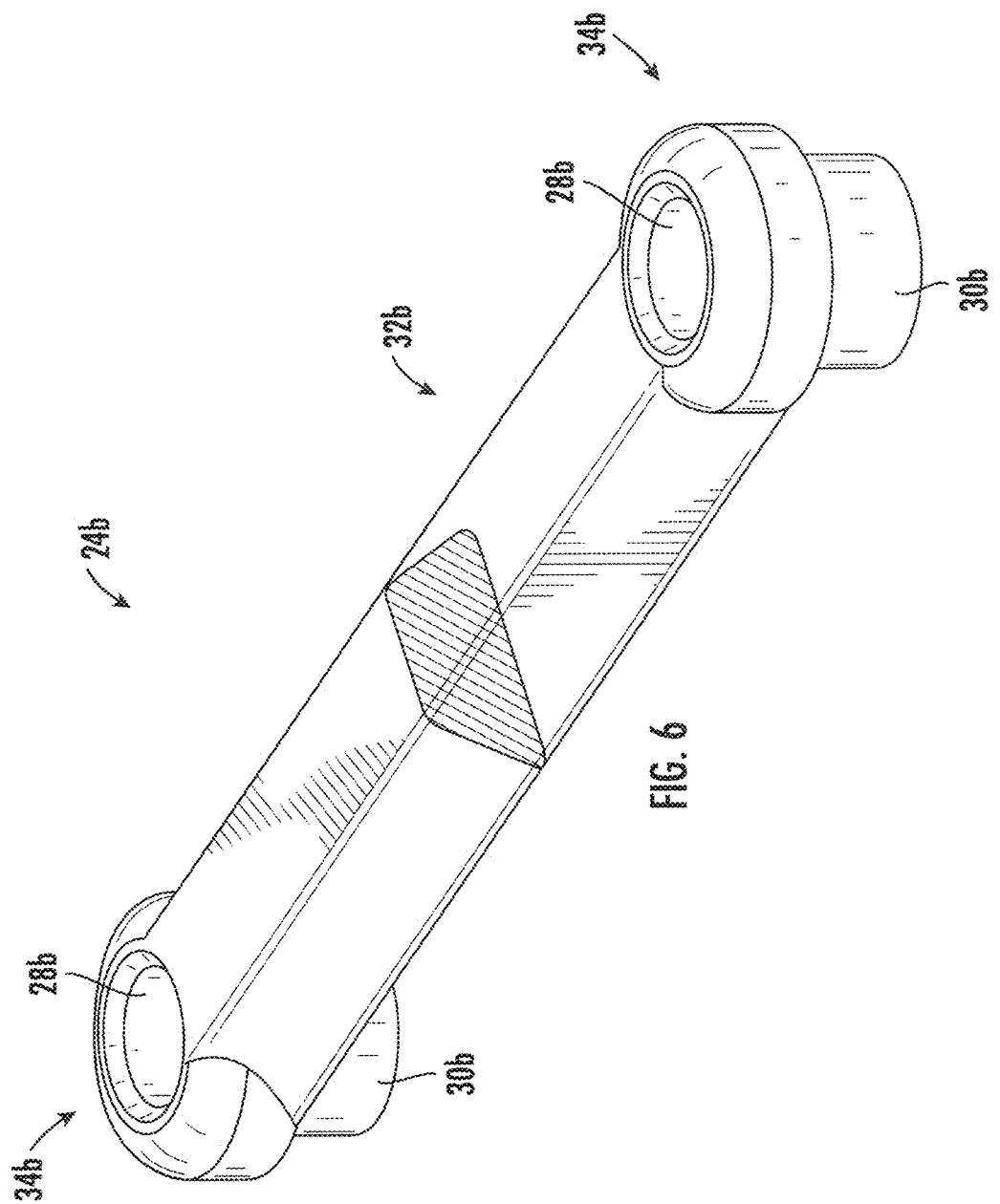
FIG. 6 depicts a perspective view of an insert according to another exemplary embodiment.

FIG. 6 depicts a perspective view of an insert 24b according to another exemplary embodiment (cf. FIG. 3).

When viewed from the bottom or top, the insert 24b according to the exemplary embodiment depicted in FIG. 6 has a bone-like contour. The insert 24b in particular has a middle portion 32b with a trapezoidal cross-section, which is smaller at the top than at the bottom, similar to the insert 24a according to the exemplary embodiment depicted in FIGS. 4 and 5.

In an insert 24b according to the exemplary embodiment depicted in FIG. 6, an opening 28b is formed in each of two basically circular end portions 34b provided at both ends of the middle portion 32b, respectively. For enhancing the strength of the insert 24b in the area of the openings 28b, the end portions 34b are formed with an increased thickness of the wall surrounding the openings 28b, respectively.

Similar to the insert 24a depicted in FIGS. 4 and 5, the end portions 34b of the insert 24b are provided with cylindrical extensions 30b surrounding the openings 28b and extending completely through the conveyance belt 12, when the insert 24b is arranged within said conveyance belt 12.

Figure 7:
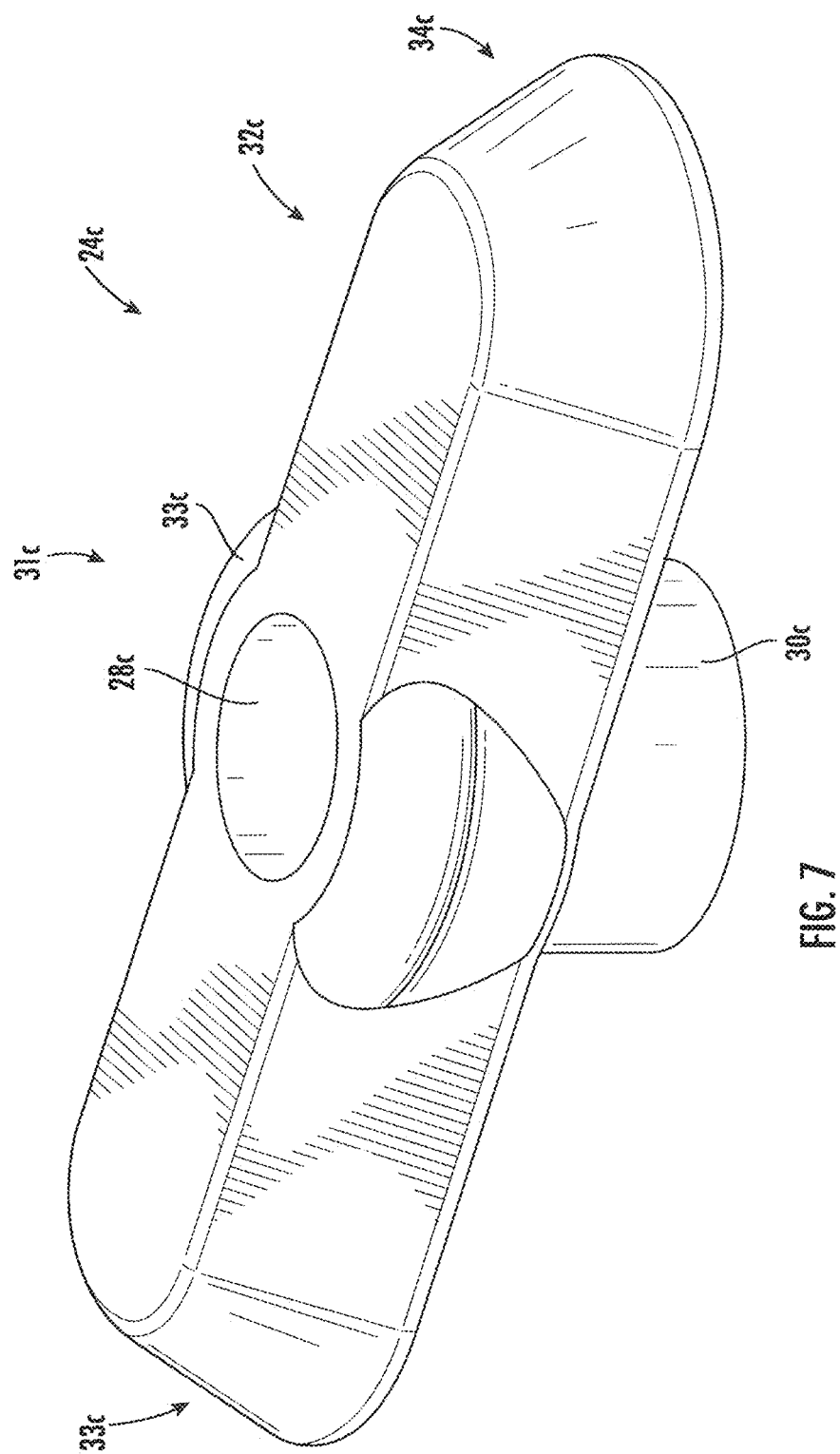
FIG. 7 depicts a perspective view of an insert according to a yet another exemplary embodiment.
Figure 8:
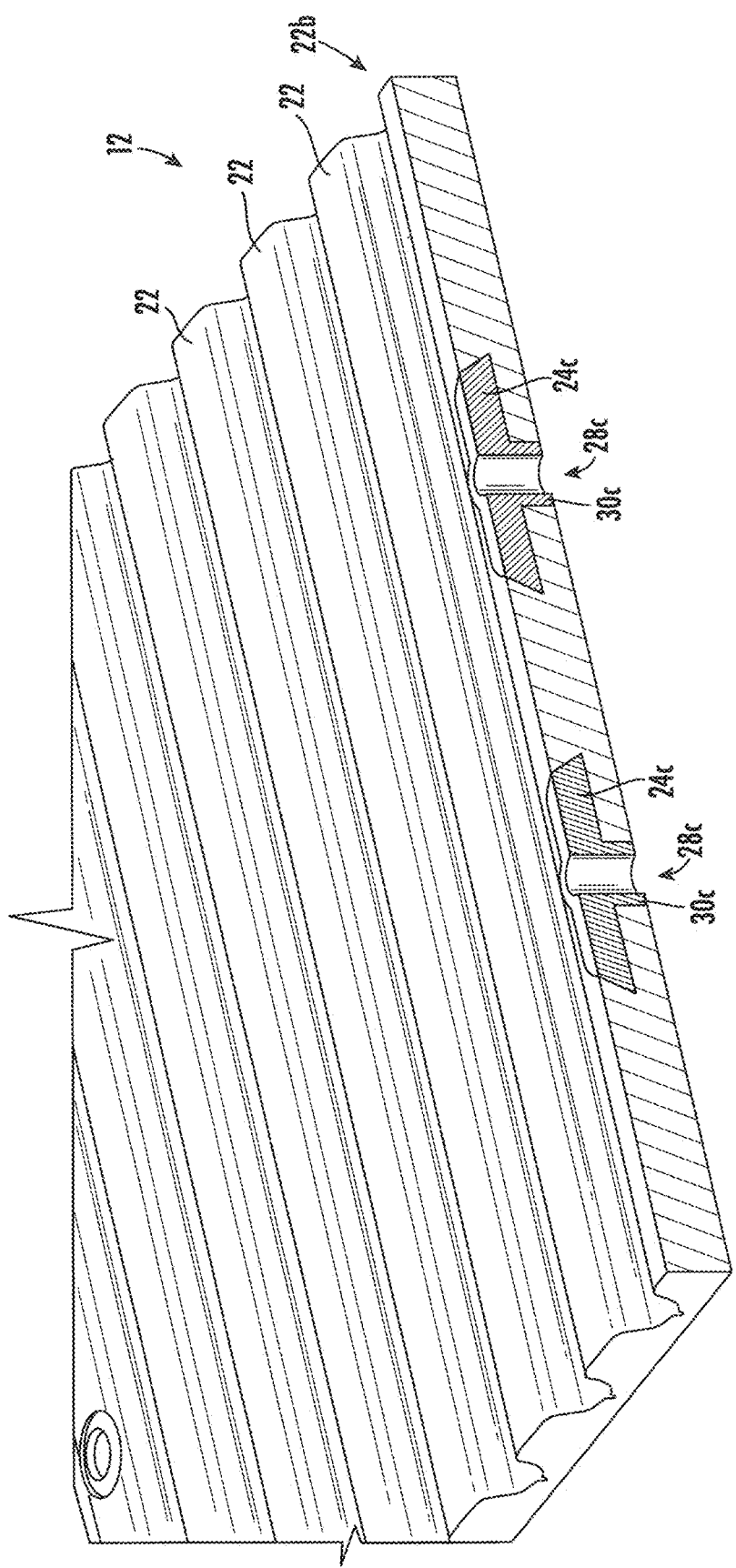

FIG. 7 depicts a perspective view of an insert 24c according to yet another exemplary embodiment (cf. FIG. 3). FIGS. 8 and 9 depict sectional views of a tooth 22c of the conveyance belt 12 accommodating two inserts 24c according to the exemplary embodiment depicted in FIG. 7, respectively.

An insert 24c according to the exemplary embodiment depicted in FIG. 7 comprises a main body 32c having a trapezoidal cross-section and two rounded end portions 34c. Contrary to the exemplary embodiment depicted in FIG. 6, the width of the end portions 34c is not larger than the width of the main body 32c. Further, no openings are formed within the end portions 34c of an insert 24c according to said exemplary embodiment.

Instead, a single opening 28c is formed in a central portion 31c of the main body 32c. The central portion 31c of the main body 32c next to the opening 28c includes an arcuate enforcement structure 33c laterally extending from the main body 32c. The enforcement structure 33c enhances the strength of the central portion 31c of the main body 32c next to the opening 28c by increasing the thickness of the wall surrounding the opening 28c.

Further, similar to the inserts 24a, 24b according to the exemplary embodiments depicted in FIGS. 3 to 6, a cylindrical extension 30c extending completely through the conveyance belt 12 (see FIG. 8) surrounds the lower portion of the opening 28c in an area below the main body 32c.

In the exemplary embodiment depicted in FIGS. 3, 8, and 9, two inserts 24c are arranged next to each other in a single tooth 22c. The two inserts 24c in particular are spaced apart from each other in a lateral direction, i.e. orthogonally to the conveyance direction of the conveyance belt 12. Such a configuration comprising two inserts 24c allows fixing two portions of a conveyance element 20 to the same tooth 22c of the conveyance belt 12 although each insert 24c comprises only a single opening 28c, respectively.

The configurations depicted in FIG. 3, in which one or two inserts 24a-24f are arranged in a single tooth 22a-22c, however, are only examples. The skilled person understands that more than one or two inserts 24a-24f may be arranged in a single tooth 22a-22c for providing an even stronger connection between the conveyance elements 20 and the conveyance belt 12.

FIG. 10 depicts a perspective view of an insert 24d according to a further exemplary embodiment.

Similar to the exemplary embodiment depicted in FIG. 6, an insert 24d according to the exemplary embodiment depicted in FIG. 10 has a bone-like contour including a middle portion 32d extending between two round end portions 34d. Similar to the exemplary embodiment depicted in FIG. 6, an opening 28d with a corresponding lower cylindrical extension 30d is formed within each of the end portions 34d, respectively.

The insert 24d depicted in FIG. 10 differs from the insert 24b depicted in FIG. 6 in that the middle portion 32d has a rectangular cross-section instead of a trapezoidal cross-section. In order to allow form-fittingly arranging the insert 24d within a corresponding cavity (not shown) of the conveyance belt 12, a protrusion 36d is formed on at least one lateral side surface 42d of the middle portion 32d.

Although only one protrusion 36d is visible in FIG. 10, the skilled person understands that a similar protrusion 36d may be formed on the opposing lateral side surface (rear side) of the middle portion 32d, which is not visible in the perspective view of FIG. 10.

The protrusion 36d depicted in FIG. 10 has an arcuate contour and extends between the two end portions 34d over the whole lengths of the middle portion 32d.

In order to allow form-fittingly arranging inserts 24d within a conveyance belt 12, corresponding recesses (not shown) configured for accommodating the protrusions 36d are formed within the cavities (not shown) provided within a matching conveyance belt 12.

FIG. 11 depicts a perspective view of an insert 24e according to another exemplary embodiment.

Similar to the exemplary embodiment depicted in FIG. 10, the insert 24e according to the exemplary embodiment depicted in FIG. 11 has a bone-like contour including a middle portion 32e extending between two round end portions 34e. Similar to the exemplary embodiment depicted in FIG. 10, an opening 28e and a corresponding lower cylindrical extension 30e are formed within each of the end portions 34e, respectively.

Contrary to the exemplary embodiment depicted in FIG. 10, instead of a protrusion 36d, a recess 36e is formed on the lateral side surfaces 42e of the middle portion 32e.

Although only one recess 36e is visible in FIG. 11, the skilled person understands that a similar recess 36e may be formed on the opposing lateral side surface (rear side) of the middle portion 32e, which is not visible in the perspective view of FIG. 11.

In order to allow form-fittingly arranging the inserts 24e according to the exemplary embodiment depicted in FIG. 11 within the conveyance belt 12, corresponding protrusions (not shown) configured for extending in to the recesses 36e of the inserts 24e are formed within the cavities (not shown) provided within a matching conveyance belt 12.

It is noted that the configuration according to the exemplary embodiment depicted in FIG. 11 is basically complementary to the configuration according to the exemplary embodiment depicted in FIG. 10.

FIG. 12 depicts a perspective view of an insert 24f according to yet another exemplary embodiment.

Similar to the exemplary embodiment depicted in FIG. 10, the insert 24f depicted in FIG. 12 has a bone-like contour including a middle portion 32f extending between two round end portions 34f. As in the exemplary embodiment depicted in FIG. 10, an opening 28f and a corresponding lower cylindrical extensions 30f are formed within each of the end portions 34f, respectively.

Contrary to the exemplary embodiment depicted in FIG. 10, instead of a single protrusion 36d extending over the whole length of the middle portion 32f between the two end portions 34f, an insert 24f according to the exemplary embodiment depicted in FIG. 10 comprises a plurality of protrusions 36f formed on the lateral side(s) 42f of the middle portion 32f.

In the exemplary embodiment of an insert 24f depicted in FIG. 12, three protrusions 36f are equidistantly spaced apart from each other along the lateral side surface 42f of the middle portion 32f. This, however, is only an example, and the skilled person understands that more or less than three protrusions 36f may be formed. Similarly, the protrusions 36f may be spaced apart from each other equidistantly as depicted in FIG. 12, or non-equidistantly.

In the exemplary embodiment depicted in FIG. 12, the protrusions 36f have a basically triangular cross-section including a top surface 38f extending basically orthogonally from a lateral side surface 42f of the middle portion 32f, and a bottom surface 40f extending in an acute angle from the lateral side surface 42f of the middle portion 32f to an outer end of the top surface 38f.

As a result, the protrusions 36f according to the exemplary embodiment depicted in FIG. 12 act as barbs when introduced into correspondingly shaped cavities (not shown). I.e. the barb-like shape of the protrusions 36f allows introducing the inserts 24f easily into correspondingly shaped cavities of the conveyance belt 12. The mechanical interaction of the protrusions 36f, in particular the orthogonally extending top surfaces 38f of the protrusions, with corresponding geometrical features of the cavities, however, prevents the inserts 24f from dropping out and/or being pulled out of the cavities.

The skilled person understands that features of the exemplary embodiments depicted in FIGS. 10 to 12 may be combined with each other. I.e. protrusions 36d, 36f or recesses 36e according to one of said exemplary embodiments may be formed on a first lateral side surface 42d-42f of a middle portion 32d-32f of an insert 24d-24f, and protrusions 36d, 36f or recesses 36e according to another one of said exemplary embodiments may be formed on an opposing second lateral side surface of the middle portion 32d-32f of the insert 24d-24f. Such a configuration results in asymmetric inserts, which may be arranged only in a predetermined orientation in a correspondingly shaped cavity (not shown).

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular exemplary embodiments disclosed, but that the invention includes all embodiments falling within the scope of the claims.

REFERENCES 1 conveyor
1a escalator
1b moving walkway
2 truss
4 balustrade
5 turnaround portion
6 handrail 7 turnaround portion
9 conveyance mechanism
10 conveyance band
11 landing portion
12 conveyance belt
14 conveyance sheave
15 drive
16 conveyance portion
17 transmission element
18 return portion
19 motor
20 conveyance element
22, 22a-22c teeth
24a-24f insert
25 roller
26a-26c cavity
28a-28f opening
30a-30f extension
31c central
32b middle portion
32c main body
32d-32f middle portion
33c enforcement structure
34c-34f end portion
36d, 36f protrusion
36e recess
38f top surface
40f bottom surface
42d-42f lateral side surface

What is claimed is:

1. Conveyance belt for a conveyor,
the conveyance belt extending in a conveyance direction and comprising a plurality of cavities, wherein each of the cavities is configured for form-fittingly accommodating a corresponding insert for connecting the conveyance belt with a conveyance element of the conveyor;
wherein the conveyance belt comprises plurality of teeth and the cavities are formed in at least some of the teeth;
wherein each of the cavities has a smaller dimension in a direction extending parallel to the conveyance direction, and a larger dimension in a direction extending orthogonally to a conveyance direction.

2. Conveyance belt according to claim 1, wherein the cavities are spaced equidistantly from each other along the conveyance direction.

3. Conveyance belt according to claim 1, wherein a plurality of cavities, which are spaced apart from each other orthogonally to the conveyance direction, are formed at a same position along the conveyance direction.

4. Conveyance belt according to claim 1, wherein at least one of the cavities is formed with an undercut for fixing a correspondingly formed insert within the cavity.

5. Conveyance belt according to claim 1, wherein at least one of the cavities comprises at least one recess configured for accommodating a matching protrusion of a corresponding insert for fixing the insert within the cavity, and/or wherein at least one of the cavities comprises at least one protrusion configured for extending into a matching recess formed within a corresponding insert for fixing the insert within the cavity.

6. Conveyance system for a conveyor, comprising:
a conveyance belt according to claim 1;
a plurality of inserts, each insert being accommodated within one of the cavities of the conveyance belt, respectively; and
a plurality of conveyance elements connected to the conveyance belt via the inserts.

7. An escalator or a moving walkway, comprising a conveyance system according to claim 6.

8. Conveyance belt according to claim 1,
wherein at least one cavity of plurality of cavities includes an open top side having a width $D_T$ in a direction extending parallel to the conveyance direction and a closed bottom side having a width $D_B$ in the direction extending parallel to the conveyance direction, where $D_T$ is less than $D_B$.

* * * * *